United States Patent [19]

O'Connell

[11] 4,333,017
[45] Jun. 1, 1982

[54] METHOD AND APPARATUS FOR CLOSED LOOP VORTEX OPERATION

[76] Inventor: John J. O'Connell, Box 10, Los Gatos, Calif. 95030

[21] Appl. No.: 198,476

[22] Filed: Oct. 20, 1980

[51] Int. Cl.³ ............................................. F25B 9/02
[52] U.S. Cl. ............................................. 290/2; 62/5
[58] Field of Search ................................. 290/2; 62/5

[56] References Cited

U.S. PATENT DOCUMENTS

| | | | |
|---|---|---|---|
| 1,952,281 | 3/1934 | Ranque | 62/5 |
| 3,173,273 | 3/1965 | Fulton | 62/5 |
| 3,208,229 | 9/1965 | Fulton | 62/5 |
| 3,654,768 | 4/1972 | Inglis et al. | 62/5 |
| 4,026,120 | 5/1977 | Tallant | 62/5 |
| 4,257,794 | 3/1981 | Shirokov et al. | 62/5 X |

Primary Examiner—J. V. Truhe
Assistant Examiner—W. E. Duncanson, Jr.
Attorney, Agent, or Firm—Owen, Wickersham & Erickson

[57] ABSTRACT

A closed loop vortex tube system having a vortex tube, a hot side loop and heat exchanger, a cold side loop and heat exchanger, a working fluid, and a start-up compressor. The hot side loop and cold side loop combine past the heat exchanger at an inlet on the vortex tube. Electrical generating means, transmission means, or distilling means are provided for deriving work from the hot side heat exchanger.

A method of operating a closed loop vortex tube system by providing a moving stream of working fluid to a vortex tube, heat exchanging the cold side output with a fluid which is warm relative to it, heat exchanging the hot side working fluid with a fluid which is cool relative to it, combining the two heat exchanged working fluids and reintroducing them to the vortex tube, and deriving a work output from the hot side heat exchanger.

37 Claims, 3 Drawing Figures

METHOD AND APPARATUS FOR CLOSED LOOP VORTEX OPERATION

BACKGROUND OF THE INVENTION

This invention relates to a method and system for heat transfer, liquid purification, and the generation of energy, obtained by employing a vortex tube in a closed system.

Heat and electricity are commonly generated in systems which consume fuels, such as fossil fuels, and which usually result in some form of pollution. Rapidly dwindling fossil fuel resources have emphasized the need for the discovery of alternate means by which to generate heat and electricity. Power from the wind, tides, the flow of streams, solar energy, and nuclear energy are being developed. The present invention relates to the use of a vortex tube as a source of such energy, among other uses.

The vortex tube was first discovered by Georges Joseph Ranque of France in 1931. It did not receive much attention until 1945, when Rudolph Hilsch of Germany published the results of his experiments using vortex tubes. Much interest has been devoted to its development since then.

A vortex tube resembles a T-shaped pipe. Pressurized gas is supplied to the central portion of the pipe and caused to rotate around its inside at very high speeds. By action of the passage of this spinning column of fluid through the precisely machined contractions and expansions inside the vortex tube, two flows of air result, one hot and one cold, respectively emerging from the two exit openings of the vortex tube. This is described in the U.S. Pat. to Hilsch (No. 1,952,281) and the U.S. Pats. to Fulton (Nos. 3,173,273 and 3,208,229), where the basic concept of vortexing is taught as well as several improvements in tubes used for it.

Several uses have been suggested for vortex tubes. For example, the Fulton 3,173,273 patent shows use of the cold side vortex output for spot freezing of objects coming into contact with an abbreviated cold exit opening. This application could be useful in cryosurgical techniques such as ophthalamic and gynecological procedures. The U.S. Pat. to Ingles (No. 3,654,768) teaches a vortex tube cooling system to be installed for automatic temperature control of electronic switching boxes and the like, taking advantage of the small sized equipment needed to effect cooling by a vortex tube.

In prior art, either the hot or the cold component of the vortex output was regularly discarded, making use of only one component. This practice reduced the efficiency of the vortex process significantly.

Another problem remaining unsolved in the prior art was how to make efficient use of heat energy generated by the vortex tube for heat transfer or generation of electricity, the typical situation being that the compressor required to drive the vortex generates more heat or uses more electricity than would be produced by the vortex tube.

It is, therefore, an object of the invention to provide a useful closed circuit system employing a vortex tube.

A further object of the invention is to employ a vortex tube for heat transfer, without requiring the constant expenditure of energy to drive a compressor.

Still another object of the present invention is to employ a vortex tube for the efficient generation of electricity.

Yet another object of the invention is to employ a closed loop system to drive a vortex tube without the constant use of a compressor, employing the flow of the vortex working fluid to continue driving the vortex once the closed system has been initialized using a start-up compressor.

Another object of the invention is the generation of energy by a pressure-driven turbine located within a closed loop vortex tube system.

A further object of the invention is to propel a vehicle by a pressure-driven turbine located within a closed loop vortex tube system.

Still another object of the invention is the thermal generation of electricity using the temperature differential from a closed loop vortex tube.

Another object of the invention is to use a closed loop vortex tube for heat transfer to a house or swimming pool.

Yet another object of the invention is to use a closed loop vortex system for purification of salt water and for waste treatment.

Other objects and advantages will become apparent to those skilled in the art from the following detailed description of the invention taken in conjunction with the accompanying drawings.

SUMMARY OF THE INVENTION

A vortex tube having a single inlet and both hot and cold outlets is disposed in a closed loop system, having a hot loop and a cold loop. The heat from the hot loop is utilized, for example, to drive a heat-exchanger, or a pressure-driven turbine. The gain of heat at the cold loop is used for environment control purposes or to absorb heat energy from a solar panel. The closed system is provided with a start-up compressor for intializing the flow of working fluid in the system. Once the system is functioning and an operating temperature differential between the hot and cold outlets has been achieved, the compressor need no longer be used; the temperature and pressure differentials of the system supply the force for driving the working fluid.

The nature of the working fluid determines the type of use to which the closed loop system may be put. For example, use of a volatile fluid, such as FREON 14, in the system will generate a significant temperature-related pressure differential, sufficient to run a pressure-driven turbine which is connected to an electric generator. Alternatively, the heat generated in the hot loop can be used to provide the necessary heat to evaporate a liquid for driving a steam turbine and thereby generate electricity. By employing heat exchange elements at the hot loop, the closed vortex system may be used to provide heating for a home or swimming pool, or to supply heat for distilling fresh water from salt water or waste.

The closed nature of the system enables the temperature differentials experienced by the working fluid to keep the working fluid in motion, thereby creating a substantially self-sustaining system. Losses of working fluid inlet velocity, pressure, and temperature due to friction and the like forces within the system are made up by transferring additional heat to the working fluid before it reaches the inlet port or by selectively reducing the amount of heat transferred from the system at the hotside heat exchanger as, for example, during initialization. Each of the gas flows is monitored for temperature, pressure, and flow rate. The system must be maintained in a precise balance to be sure that the proper amounts of energy are being given off at each heat exchange location. The loss or gain of too much energy at any one point has a tendency to stall the system.

BRIEF DESCRIPTION OF THE DRAWINGS

The invention will now be explained with reference to the accompanying drawings in which.

DESCRIPTION OF THE PREFERRED EMBODIMENTS

The closed loop vortex system is based on the use of both hot and cold loops in conjunction with a vortex tube to generate two modes of working potential. Temperature differentials of approximately 200° F. may be produced from an inlet temperature of 70° F. for production of steam to run a turbine for generating electric power. Use of a working fluid, such as FREON 14, yields very high pressure differentials which may be used to run pressure-driven turbines.

Figure 1:
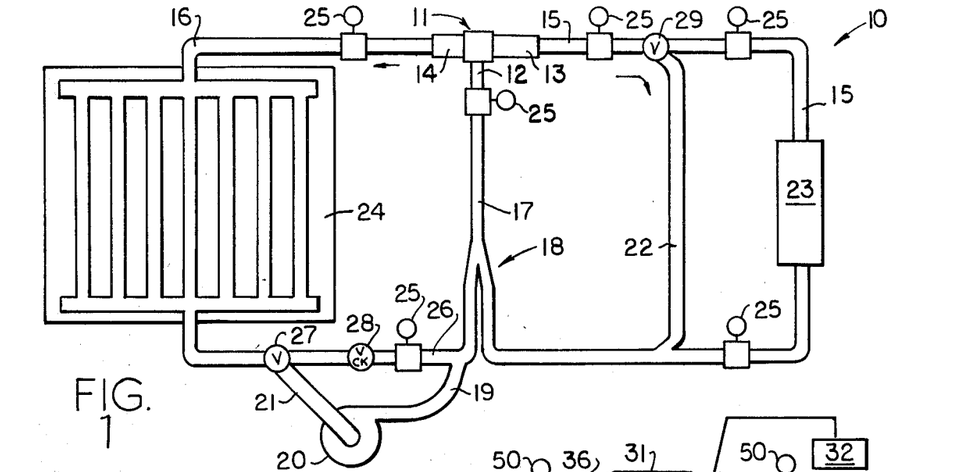
FIG. 1 is a diagrammatic view of a closed vortex system embodying the principles of the invention, illustrating an embodiment used for heat exchange properties, also showing the use of a solar panel for restoring heat which is given up by the system.

As illustrated in FIG. 1, a first closed loop vortex tube system 10 includes a vortex tube 11 having an inlet 12, a hot outlet 13 and a cold outlet 14. The hot outlet 13 is connected to a hot loop 15. The cold outlet 14 is similarly connected to a cold loop 16. The hot and cold loops 15 and 16 meet at a return or inlet tube 17 combining their flows at an intersection 18. There, the kinetic energy of the moving, working fluid gradually replaces the work output of a start-up compressor 20, which is connected to the system 10 via a parallel compressor line 21 which extends off the cold loop 16 and has an outlet line 19 which rejoins the system 10 at the end of the cold loop 16.

As illustrated in FIG. 1 the hot loop 15 is a free-flowing gas channel divided into two routes, a hot loop by-pass 22 and a normal hot loop route 15 passing through a hot-side heat exchanger means 23, The cold loop 16 passes through a cold-side heat exchanger means 24, which may be, for example, a solar panel or air conditioning unit, disposed where the cold side fluid from the vortex tube 11 acquires heat to replace that which was lost to the hot side heat exchanger 23.

The cold side loop 16 is a free-flowing gas channel. The type of heat exchanger chosen to be used on the cold side loop 16, such as the solar panel 24 shown in FIG. 1, depends on the low temperature source used for heat collection, since, in the presence of moisture, ice will form on the loop due to the temperature of the cold flow.

A series of parameter monitors 25 are located, preferably as illustrated, throughout the system to monitor the temperature, pressure, and rate of flow of the working fluid at those points of the system. These points are preferably at the cold loop 16, just beyond the cold outlet 14, at the hot loop 15 just after the hot outlet 13 and after the hot side heat exchanger 23, at the inlet tube 17 just before the vortex inlet 13, and at a cold loop return line 26.

Initialization of the system is accomplished with the use of a start-up compressor 20 which takes the working fluid from the cold side loop 16 and supplies it under pressure via the inlet line 17 to the vortex tube inlet port 12. It may be seen in FIG. 1 that the compressor 20 is installed in parallel fashion with the cold loop 16 and its return line 26. A valve 27 in the cold loop return line 26 insures the channeling of a proper percentage of flow between the compressor line 21 and the compressor bypass line 26 as the hot side 13 and cold side 14 come up to operating temperature, at which time the system will be able to supply the necessary velocity, pressure, and temperature requirements of the inlet port 12. A check valve 28 between the valve 27 and the intersection 18 insures the proper direction of working fluid flow from the start-up compressor outlet 19. During initialization, the working fluid is channeled through the hot loop bypass 22 to prevent heat loss through the hot-side heat exchanger 23, thereby allowing the system to come up to operating temperature in the shortest possible time. A valve 29, disposed at the junction between the hot loop 15 and the hot loop bypass 22, is used to channel the desired amount of working fluid between these routes. The valve 29 is also used to regulate the percentage of hot-to-cold fraction, which is controlled by imposing a resistance to flow out of the hot outlet 13 during vortex operation. Alternatively, two valves may be employed here; one for channeling working fluid and another for regulating hot outlet resistance.

In operation, with a working fluid at ambient temperature, or approximately 70° Farenheit, with an inlet pressure of 100 psi and with the vortex tube 11 being set at 50% cold fraction, the resulting hot flow will be raised to about 161° Farenheit and the cold flow lowered to about -29° Farenheit. The cold-side working fluid, via the cold-side heat exchanger 24, will be used to recover heat energy given up at the hot-side heat exchanger 23. To maintain self-sustained operation at this parameter level, the valve 29 is adjusted so that enough hot-side working fluid will bypass the hot-side heat exchanger 23 via the bypass 22 to replace any energy which the cold-side working fluid cannot recover at the cold-side heat exchanger, thereby maintaining a sufficient operating flow of working fluid to the inlet port 12.

The vortex tube 11 can operate at 11, 15 or 25 cubic feet per minute of working fluid. It is possible to select a percentage of hot or cold flow of between 20% and 80% to either the hot outlet 13 or the cold outlet 14. The system parameters should be set to maximize heat energy gain on the cold side for the embodiment used for a steam-driven turbine generation of electricity, in which the hot-side heat exchanger means 23 are used to heat a liquid to boiling and generate steam from it, which in turn drives a turbine.

Figure 2:
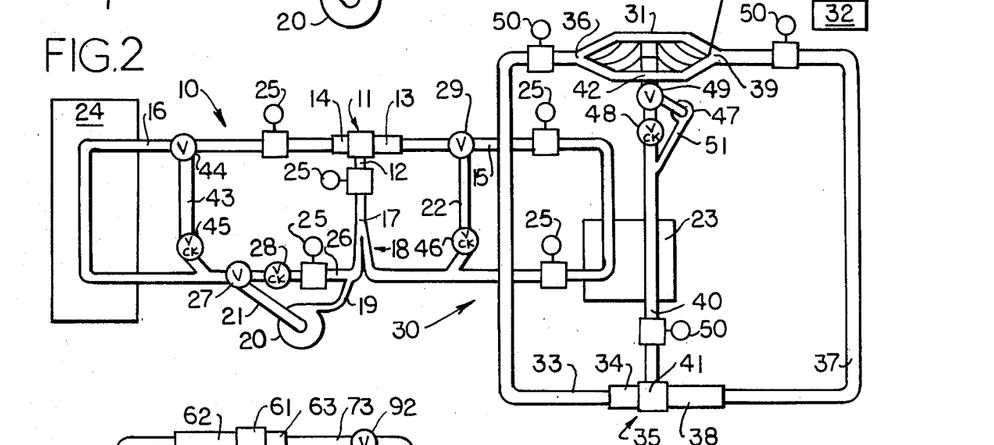
FIG. 2 is a diagrammatic view of a closed-loop vortex embodying the principles of the invention, showing an embodiment in which a turbine is driven to generate electricity.

In another embodiment, illustrated in FIG. 2, a second closed loop vortex tube system 30 may be used to propel a pressure-driven turbine 31, which in turn drives an external electromagnetic generator 32. A cold-side loop 33 connects a cold outlet 34 of a vortex tube 35 to a low-pressure inlet 36 on the pressure driven turbine 31. A hot-side loop 37 connects a hot-side outlet 38 of the vortex tube 35 to a high-pressure inlet 39 on the pressure driven turbine 31. The system 30 employs as one part, the first system 10 as illustrated in FIG. 1, wherein the hot-side heat exchanger 23 of the first system 10 is used to heat the working fluid in an inlet tube 40 connected between an inlet port 41 of the vortex tube 35 and an exhaust port 42 on the turbine 31 in the second system 30. For use in this embodiment, the first vortex system 10 should also have a cold loop bypass 43 and a valve 44 for channeling the flow of working fluid therethrough. Check valves 45 and 46 may be disposed at the ends of the hot bypass 22 and the cold bypass 43 to insure the proper direction of working fluid flow. Selective use of the cold bypass 43 during normal operation will improve the rate of response of the first vortex tube system 10 during periods of peak demand. This is achieved by impairing flow through the cold bypass 43 by using the valve 44; thereby additional working fluid passes through the cold-side heat exchanger 24, causing an increase in the temperature of the combined working fluid which is fed to the inlet 12 of the first vortex tube 11. In this manner, the amount of heat energy which is available to be transferred from the hot-side heat exchanger 23 to the inlet tube 40 of the second vortex tube 35 is increased. Flow through the hot-side bypass 22 may also be impaired to maximize the amount of hot side working fluid passing through the hot side heat exchanger 23. Therefore, during non-peak load operation, the hot and cold side working fluid in the first vortex system 10 may be partially diverted through the respective bypass lines 22 and 43 to result in less than maximum heat exchange to the inlet tube 40 of the second vortex tube 35, since maximum heat exchange is not always required here. The usefulness of this feature will be more apparent in an embodiment where the second vortex tube system 30 is combined with a transmission to propel a vehicle, as will be described later.

Whereas any suitable working fluid may be used in the first system 10, the working fluid of the second system 30 must be highly pressure responsive to changes in temperature, as is FREON 14.

For system initialization, a start-up compressor 47 and a corresponding bypass 48 controlled by a valve 49 may be connected to the inlet tube 40 in the second system 30 between the turbine exhaust outlet 42 and the heat exchanger 23. A plurality of parameter monitors 50 may also be used, as illustrated in FIG. 2. The compressor bypass 48 also should have a check valve 51.

Therefore, in operation, the system 30 provides a stream of working fluid to the inlet port 41 of the vortex tube 35. The vortex tube 35 emits a hot output of working fluid which develops a high pressure from thermal expansion, and a cold output of working fluid which develops a low pressure due to thermal contraction. The hot high-pressure and cold low-pressure working fluids are supplied to the respective inlets 36 and 39 on the pressure driven turbine 31 causing it to rotate quickly, consequently turning the generator 32 and producing electricity which may be used or stored as desired. For example, part could be used to power a start-up generator or the like. The two streams of working fluid are mixed together at the turbine exhaust outlet 42 which connects to the inlet tube 40. They are re-warmed by the hot side heat exchanger 23 of the first system 10 and start the process over again by entering the inlet port 41 of the vortex tube 35. This embodiment illustrates the effect of combining several closed loop vortex tube systems in sequence for attaining progressively warmer and cooler ranges of temperature differential.

Alternatively, the embodiment shown in FIG. 2 may be used as a source of propulsion to drive a vehicle. In that instance, the generator 32 would be replaced by a transmission type mechanism (not shown) connected to the work output of the pressure driven turbine 31. In this manner, the vehicle's motor would be closed-loop vortex tube system 30 and drive would be imparted to the vehicle through the transmission and its connection to the turbine. In this embodiment, the cold-side heat exchanger 24 of the first vortex tube system 10 may be used in heat exchange relationship with the transmission, thereby regaining heat energy used for propulsion and at the same time cooling the transmission.

An alternative method of generating electricity using the vortex tube system 30 as shown in FIG. 2 would entail the replacement of the pressure-driven turbine 31 with a P-N type device or semiconductor (not shown), whereby the cold side loop 33 would be in heat exchange relationship with one side of the semiconductor and the hot side loop 37 would be in heat exchange relationship with the other side of the semiconductor both loops 33 and 37 combining after the heat exchangers at an intersection leading to the vortex tube inlet port 41. The first vortex tube system 10 would still be used to provide heat to the working fluid before it reaches the inlet 41 on the second vortex tube 35. Essentially, this amounts to combining two units of the first system 10, wherein the heat exchanger 23 of one system is used to heat working fluid at the inlet port 12 of the second system 10. The hot and cold side heat exchangers 23 and 24 of the second system 10 would be in heat exchange relationship with the P-N device, which, generates electricity by the migration of electrons due to temperature differential between adjacent electrophillic and electrophobic materials.

Figure 3:
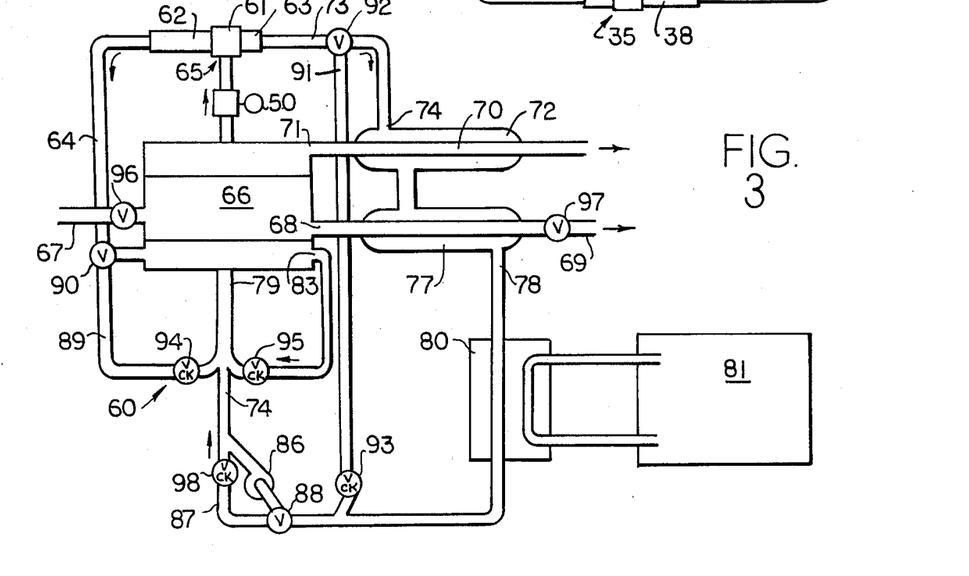
FIG. 3 is a diagrammatic view of a closed loop vortex system embodying the principles of the invention, showing an embodiment wherein salt water or waste may be purified.

FIG. 3 illustrates an embodiment of the invention wherein a system 60 may be used for waste treatment or to distill fresh water from salt water. The system 60 includes a vortex tube 61 having a hot outlet 62 and a cold outlet 63. The hot outlet 62 is connected via a line 64 to a heater or hot side heat exchanger 65 which is disposed at the bottom of a reservoir 66. The reservoir 66 is connected, through an input line 67, to a supply of salt water or waste to be treated. The bottom of the reservoir has a concentrated waste outlet 68 connected to a concentrated waste line 69. Steam collects at the top of the reservoir 66 and is passed to a fresh water tube 70 which connects to the top of the reservoir 66 at a steam outlet opening 71. The fresh water tube 70 passes through a first condenser 72, the jacket of which is fed the cold output working fluid from the vortex tube 61 by a line 73 connecting the cold outlet 63 to an inlet 74 of the first condenser 72. The passage of steam through the first condenser 72 results in condensation and in the production of fresh water or purified liquid which may be stored or used as desired.

An outlet 75 of the first condenser 72 connects to an inlet 76 of a second condenser 77 through which concentrated waste line 69 passes. The waste remaining in the reservoir 66 may be cooled and disposed of, or used as desired, depending on what is being purified.

The exchange of heat between the cold-side working fluid and the concentrated waste passing through the second condenser 77 will supply additional heat to the cold-side working fluid, helping to raise its temperature to a desired inlet temperature for the vortex tube 61. Also, where the system is taking sea water via inlet line 67 and depositing concentrated salt back to the ocean via concentrated waste line 69, the cooling of such concentrated waste is ecologically desirable for the marine life in the area of the outlet.

A working fluid outlet 78 on the second condenser 77 connects to a return and inlet tube 79 which may pass through a heat exchanger 80, supplied with heat from, for example, solar panels 81. The now-warmed returning cold-side working fluid mixes with hot-side working fluid which has passed through the heater 65 via a hot return line 82, connected to a heater outlet 83 and joining return inlet line 79 at an intersection 84. The return and inlet tube 79 then feeds an inlet port 85 on the vortex tube 61.

For initialization, the third system 60 would also have a start-up compressor 86 in parallel with the return line 79. As in the first system 10, a compressor bypass 87 and a valve 88 to control the flow of fluid between the compressor 86 and the bypass 87 are also provided. A hot-loop bypass 89 controlled by a valve 90 connects the hot-side line 64 to the return line 79 avoiding the heat exchanger 65. Similarly, a cold-loop bypass 91 controlled by a valve 92 connects the cold line 73 to the return line 79, for bypassing the condensers 72 and 77. Check valves 93, 94 and 95 may be disposed respectively before the connection of the cold loop bypass 91 to the return line 79, the hot-loop bypass 89 and the return line 79, and the heater outlet 83 and the return line 79. A valve 96 should be disposed between inlet line 67 and the reservoir 66. Another valve 97 should be disposed between the second condensor 77 and the waste outlet line 69. System initialization may be accomplished by diverting the flow of output fluid through the bypass lines 89 and 91 as the system begins to approach an operating temperature. Then, valves 90 and 92 may be engaged to supply working fluid to the heater 65 and the condensers 72 and 77. Gradually, the fluid being treated will approach boiling temperature and as it does, the valves 96 and 97 should be opened to permit the flow of additional fluid to be treated into the reservoir 66 and the flow of waste fluid out through the waste line 69.

The preferred embodiments described herein are intended to be purely illustrative, and not limiting of the scope of the invention. Other embodiments and variations will be apparent to those skilled in the art and may be made without departing from the essence and scope of the invention as defined in the following claims.

I claim:

1. A method of generating electricity by using a closed loop vortex tube system comprising:
    moving a stream of working fluid at a selected temperature to the inlet port of a vortex tube having a hot outlet port for emitting a hot output working fluid and a cold outlet port for emitting a cold output working fluid,
    heat exchanging said hot output working fluid with electric generating means to draw off the heat acquired by said working fluid upon passing through the vortex tube, and generating electricity therewith,
    heat exchanging said cold output working fluid with a fluid which is warm relative to said cold output working fluid for regaining an amount of heat energy comparable to the heat exchanged with said electric generating means,
    combining said heat exchanged cold output working fluid and said heat exchanged hot output working fluid, and
    moving the combined stream to the inlet port of said vortex tube.

2. The method of generating electricity of claim 1 further including an initialization step comprising:
    artificially moving said stream of working fluid to the inlet port of said vortex tube,
    blocking the exchange of heat between said hot output working fluid and said electric generating means,
    monitoring the temperature, pressure, and rate of flow of said working fluid, and
    incrementally discontinuing the artificial movement of said stream of working fluid and unblocking the exchange of heat between said hot output working fluid and said electric generating means as the difference in temperature between said hot output working fluid and said cold output working fluid approaches a difference sufficient to sustain movement of said combined stream of working fluid and thereby sustain vortex motion in said vortex tube.

3. A method of using a closed loop vortex tube system comprising:
    moving a stream of working fluid at a selected temperature from within a closed system to the inlet port of a vortex tube having a hot outlet port for emitting a hot output working fluid and a cold outlet port for emitting a cold output working fluid,
    heat exchanging said cold output working fluid with a body which is warm relative to it, deriving a work output therefrom,
    heat exchanging said hot output working fluid with a body which is cool relative to it, deriving a work output therefrom,
    combining said heat exchanged cold output working fluid and said heat exchanged hot output working fluid, and
    moving the combined stream to said vortex tube inlet port.

4. The method of claim 3 further including an initialization step comprising:
    artificially moving said stream of working fluid to the inlet port of said vortex tube,
    blocking the exchange of heat between said hot output working fluid and said body which is cool relative to it,
    monitoring the temperature, pressure, and rate of flow of said working fluid, and
    incrementally discontinuing the artificial movement of said stream of working fluid and unblocking the exchange of heat between said hot output working fluid and said body which is cool relative to it proportionally, as the temperature difference between said hot output working fluid and said cold output working fluid approaches a difference sufficient to sustain movement of said combined stream of working fluid and thereby sustain vortex motion in said vortex tube.

5. A method of generating electricity using a closed loop vortex tube system comprising:
    moving a stream of temperature/pressure responsive working fluid to the inlet port of a vortex tube having a hot outlet port for emitting a high pressure hot output working fluid and a cold outlet port for emitting a low pressure cold output working fluid, moving said hot output high pressure working fluid from said vortex tube hot outlet port to a high pressure inlet of a pressure driven turbine, moving said cold output low pressure working fluid from said vortex tube cold outlet port to the low pressure inlet of a pressure driven turbine, transferring the energy of said hot output high pressure working fluid and said cold output low pressure working fluid to spin said turbine and in turn spin an electric generator connected to said turbine, thereby generating electricity, and moving the exhaust from said turbine back to said vortex tube inlet, recommencing the cycle.

6. The method of claim 5 further comprising:

heat exchanging said turbine exhaust with a fluid which is warm relative to it for regaining the energy transferred to said turbine before said exhaust enters said vortex tube inlet port.

7. The method of claim 5 further comprising:

monitoring the temperature, pressure, and velocity of said working fluid between said hot vortex outlet and said turbine high pressure inlet, between said cold vortex outlet and said turbine low pressure inlet, and between said turbine exhaust and said vortex tube inlet port.

8. A method of salt water and waste purification using a closed loop vortex system, comprising:

moving a stream of working fluid at a selected temperature to the inlet port of a vortex tube having a hot outlet port for emitting a hot output working fluid and a cold outlet port for emitting a cold output working fluid, moving a fluid to be purified into a distilling apparatus having a reservoir, a purified fluid line and condensor, and a waste fluid line and condensor, heat exchanging said hot output working fluid with said fluid to be purified, thereby evaporating a pure fluid from said fluid to be purified and leaving a concentrated waste fluid in said reservoir, moving said vaporized pure fluid through said purified fluid line and condensor, heat exchanging said cold working fluid with said vaporized pure fluid, thereby condensing said vaporized pure fluid, heat exchanging said cold output working fluid with said concentrated waste fluid, thereby cooling said concentrated waste fluid, collecting said pure fluid, combining the heat exchanged cold output working fluid, and moving said combined stream of working fluid back to the inlet port of said vortex tube, recommencing the vortex cycle.

9. The method of claim 8 further including an initialization step comprising:

artificially moving said stream of working fluid to the inlet port of said vortex tube, blocking the movement of fluid through said concentrated waste fluid line, heat exchanging said cold output working fluid with a fluid which is warm relative to it, monitoring the temperature, pressure, and rate of flow of said working fluid, and discontinuing the artificial movement of said stream of working fluid, unblocking the movement of fluid through said concentrated waste fluid line and blocking the exchange of heat between said cold output working fluid and said fluid which is warm relative to it, incrementally when the difference in temperature between said hot output working fluid and said cold output working fluid approaches a difference sufficient to sustain movement of said combined stream of working fluid and thereby sustain vortex motion in said vortex tube.

10. The method of claims 2, 4, or 9 wherein said temperature difference is at least approximately 200° Farenheit.

11. The method of claims 2, 4, or 9 further comprising:

periodically heat exchanging said cold output working fluid with a body which is warm relative to it after said temperature difference is achieved, to restore any working fluid losses in said temperature differential due to friction within said closed system.

12. A closed-loop vortex tube system comprising:

a vortex tube having an inlet port, a cold outlet and a hot outlet, an inlet tube connected to said inlet port, a cold-loop tube connected to said cold outlet, a hot-loop tube connected to said hot outlet, said cold-loop tube and said hot-loop tube joining together at said inlet tube, cold-loop heat exchanger means for deriving a work output connected to said cold-loop tube between said cold outlet and said inlet tube, hot-loop heat exchanger means for deriving a work output connected to said hot-loop tube between said hot outlet and said inlet tube, a working fluid in said system, a start-up compressor means having an inlet and an outlet, said inlet connected to said cold-loop tube at a point after said cold-loop heat exchanger means, and said outlet connected to said vortex inlet tube, said start-up compressor means adapted to move working fluid to said vortex tube inlet port at a pressure and rate of flow sufficient for causing a vortex of working fluid within said vortex tube.

13. The closed-loop vortex tube system of claim 12 further comprising:

a start-up compressor bypass tube, said compressor bypass tube having an inlet connected to said cold-loop tube between said cold-loop heat exchanger means and said start-up compressor inlet, said compressor bypass tube having an outlet connected to said vortex inlet tube, and valve means for directing a selected portion of said working fluid between said start-up compressor and said start-up compressor bypass tube.

14. The closed-loop vortex tube system of claims 12 or 13 further comprising:

a hot-loop heat exchanger bypass tube having an inlet and an outlet, said inlet connected to said hot-loop tube before said hot-loop heat exchanger, said outlet connected to said hot-loop tube after said hot-loop heat exchanger, and valve means for directing a selected portion of said working fluid between said hot-loop exchanger means and said hot-loop heat exchanger bypass.

15. The closed-loop vortex tube system of claim 12 further comprising:

a plurality of monitoring means for measuring the temperature, pressure, and rate of flow of said working fluid, said monitoring means disposed at said cold-loop before and after said cold-side heat exchanger means, at said hot-loop before and after said hot-side heat exchanger means, and at said inlet tube before said vortex tube inlet port.

16. The closed-loop vortex tube system of claim 12 adapted for electric generation, comprising:
electric generator semiconductor means disposed in heat exchange relationship with said cold and hot side heat exchanger means,
said electric generator semiconductor means utilizing the heat transferred from said hot and cold output working fluid to generate electricity.

17. The closed-loop vortex tube system of claim 12 adapted for electricity generation, further comprising:
a pressure driven turbine having a high pressure inlet, a low pressure inlet, and an exhaust outlet,
an electric generator connected to said turbine,
a second closed-loop vortex tube system which comprises:
a second vortex tube having an inlet port, a hot outlet and a cold outlet,
a second inlet tube connected to said second inlet port,
a second hot outlet tube connected to said second hot outlet, and
a second cold outlet tube connected to said second cold outlet,
a second vortex working fluid which develops a great pressure differential upon temperature change, disposed in said second closed-loop vortex tube system,
said second hot outlet tube connected to the high pressure inlet of said pressure driven turbine,
said second cold outlet tube connected to the low pressure inlet of said pressure driven turbine,
said turbine outlet connected by said second inlet tube to said second vortex tube inlet port,
the hot-loop heat exchanger means of said first vortex tube connected in heat exchange relationship with said second vortex inlet tube, and
a second start-up compressor having an inlet and an outlet, said inlet connected to said second vortex inlet tube between said turbine exhaust outlet and said first vortex hot-loop heat exchanger connection, and said outlet connected to said second vortex inlet tube between said second start-up compressor inlet and said first vortex hot-loop heat exchanger connection,
whereby the turning of said turbine turns said generator, thereby generating electricity.

18. The closed-loop vortex tube system of claim 17 further comprising:
a second start-up compressor bypass tube,
said second compressor bypass tube having an inlet connected to said second vortex inlet tube between said turbine exhaust outlet and said second start-up compressor inlet,
said second start-up compressor bypass tube having an outlet connected to said second vortex inlet tube between said second start-up compressor inlet and said first vortex hot-loop exchanger connection,
and valve means for directing a selected portion of said working fluid between said second start-up compressor and said second start-up compressor bypass tube.

19. The closed-loop vortex tube system of claim 12 adapted for propelling a vehicle, further comprising:
a pressure driven turbine having a high pressure inlet, a low pressure inlet, and an exhaust outlet,
a transmission means connected to said turbine,
a vehicle connected to said transmission means to be propelled thereby,
a second closed-loop vortex tube system which comprises:
a second vortex tube having an inlet port, a hot outlet and a cold outlet,
a second inlet tube connected to said second inlet port,
a second hot outlet tube connected to said second hot outlet, and
a second cold outlet tube connected to said second cold outlet,
a second vortex working fluid which develops a great pressure differential upon temperature change, disposed in said second closed-loop vortex tube system,
said second hot outlet tube connected to the high pressure inlet of said pressure driven turbine,
said second cold outlet tube connected to the low pressure inlet of said pressure driven turbine,
said turbine outlet connected by said inlet tube to said second vortex tube inlet port,
the hot-loop heat exchanger means of said first vortex tube connected in heat exchange relationship with said second vortex inlet tube, and
a second start-up compressor having an inlet and an outlet, said inlet connected to said second vortex inlet tube between said turbine exhaust outlet and said first vortex hot-loop heat exchanger connection, and said outlet connected to said second vortex inlet tube between said second start-up compressor inlet and said first vortex hot-loop heat exchanger connection,
whereby the turning of said turbine turns said transmission, thereby propelling said vehicle.

20. The closed-loop vortex tube system of claim 19 further comprising:
a cold side heat exchanger bypass tube in said first vortex tube system connected to said cold loop before and after said cold-side heat exchanger,
valve means for directing a selected portion of said first system working fluid between said cold-side heat exchanger and said cold-side heat exchanger bypass,
a second start-up compressor bypass tube,
said second compressor bypass tube having an inlet connected to said second vortex inlet tube between said turbine exhaust outlet and said second start-up compressor inlet,
said second start-up compressor bypass tube having an outlet connected to said second vortex inlet tube between said second start-up compressor inlet and said first vortex hot-loop heat exchanger connection, and
valve means for directing a selected portion of said working fluid between said second start-up compressor and said second start-up compressor bypass tube.

21. The closed loop vortex tube system of claim 17 or 19 wherein said second vortex working fluid is FREON 14.

22. The closed loop vortex tube system of claim 12 wherein said cold-side heat exchanger means is a solar panel.

23. The closed loop vortex system of claim 12 wherein said cold-side heat exchanger is an air-conditioning unit.

24. The closed loop vortex tube system of claim 12 adapted for salt water and waste purification, further comprising:
a distilling apparatus means having an evaporating section and a condensing section,
said hot loop tube connected to said evaporating section for providing heat to cause evaporation of any impure liquid in said evaporating section, and
the cold loop tube connected to said condensing section for condensing said vapor to yield a pure liquid.

25. The closed loop vortex tube system of claim 12 adapted for salt water and waste purification, further comprising:
a distilling apparatus, said distilling apparatus comprising:
a heater element,
a reservoir disposed in heat exchange relationship adjacent with said heater element,
a steam outlet disposed at the top of said reservoir,
a steam line, said steam outlet connected to said steam line,
a condenser having an outer fluid jacket and an inner sleeve, said condenser inner sleeve connected to said steam line to cool said steam and thereby condense it, wherein
said hot-loop heat exchanger means is said heater element, and
said cold loop exchanger means is said condenser.

26. The closed loop vortex system of claim 25 wherein said distilling apparatus further comprises:
a second condenser having an outer fluid jacket and an inner sleeve,
a concentrated waste outlet port disposed in said reservoir near its bottom,
a waste line, said waste outlet port connected to said waste line and said waste line connected to the inner sleeve of said second condenser, wherein
said cold-loop heat exchanger means comprises said first and said second condensers.

27. The closed-loop vortex system of claim 26 further comprising:
second cold-loop heat exchanger means, wherein
said cold-loop tube is connected between said cold outlet port and said first condenser jacket, between said first condensor jacket and said second condenser jacket, between said second condenser jacket and said second cold-loop heat exchanger means, and between said second cold-loop heat exchanger means and said start-up compressor.

28. A closed-loop vortex tube system for purification of salt water and waste, comprising:
a vortex tube having an inlet port, a hot outlet port and a cold outlet port,
an inlet tube connected to said inlet port,
a hot-loop tube connected to said hot outlet port,
a cold-loop tube connected to said cold outlet port,
a working fluid in said closed system,
distilling apparatus means having an evaporating section and a condensing section,
said vortex hot outlet port connected by said hot-loop tube to supply heat to said evaporating section,
said cold outlet port connected by said cold-loop tube to supply cooling to said condensing section,
said hot and cold loop lines combining at a said vortex inlet tube after said distilling apparatus means, and
a start-up compressor connector to said cold-loop tube after said distilling apparatus means.

29. The closed-loop vortex tube system of claim 28 wherein said evaporating section comprises:
a heater element and a reservoir, said reservoir having
a waste inlet
a heat inlet,
a heat outlet
a waste outlet disposed toward the bottom of said reservoir, and
a vapor outlet disposed toward the top of said reservoir,
said hot-loop tube connected to said heat inlet, and said heat outlet connected to said vortex inlet tube,
an werein said condensing section comprises:
first and second condensers, each having an inner sleeve and an outer cooling jacket, and
first and second collecting means, said first condenser inner sleeve connected to said vapor outlet at one end and to said first collecting means at the other end,
said second condenser inner sleeve connected to said waste outlet at one end and to said second collecting means at the other end,
each said outer cooling jacket having an inlet port and an outlet port,
drain valve means disposed between said waste outlet and said second condenser inner sleeve for controlling the flow of concentrated waste from said reservoir,
said cold-loop tube connected to said inlet in said first condenser cooling jacket, then from said outlet in said first condenser cooling jacket to said inlet in said second condenser cooling jacket, and then from said outlet in said second condenser cooling jacket to said start-up compressor.

30. The closed-loop vortex tube system of claim 29 further comprising:
cold-side heat exchanger means connected to said cold-loop tube between said second condenser cooling jacket outlet and said start-up compressor.

31. The closed-loop vortex system of claim 29 further comprising:
a start-up compressor bypass line connected in parallel with said cold-loop tube, having an inlet and an outlet, said inlet connected between said second condenser cooling jacket outlet and said start-up compressor, and said outlet connected to said vortex inlet tube, and
valve means disposed along said cold-loop tube after said compressor bypass tube to control the flow of working fluid between said compressor bypass line and said compressor.

32. The closed loop vortex tube system of claim 31 further comprising:
cold side heat exchanger means connected to said cold outlet line between said second condenser cooling jacket outlet and said compressor bypass tube.

33. A closed-loop vortex tube system for generating electricity, comprising:
a vortex tube having an inlet port, a hot outlet and a cold outlet, a pressure-driven turbine having a high-pressure inlet port, a low-pressure inlet port, and an exhaust port, first tube means for connecting said hot outlet to said high-pressure inlet port, second tube means for connecting said cold outlet to said low-pressure inlet port, and third tube means for connecting said vortex tube inlet port to said turbine exhaust port, a working fluid which develops a great pressure differential corresponding to temperature change disposed in said system, an electric generator connected to said turbine, and heat exchanger means in contact with said third tube means between said vortex tube inlet port and said turbine exhaust port for transferring heat to said working fluid.

34. The closed-loop vortex tube system of claim 33 wherein said heat exchanger means is the hot-loop heat exchanger of another closed-loop vortex tube system.

35. The closed-loop vortex tube system of claim 34 further comprising:

start-up compressor means connected via parallel tube means to said third tube means between said heat exchanger means and said vortex tube inlet port, and control valve means disposed in said parallel tube means before said start-up compressor for controlling the flow of working fluid between said third tube means and said start-up compressor parallel tube means.

36. The closed-loop vortex tube system of claim 33 wherein said working fluid is FREON 14.

37. The closed-loop vortex tube system of claim 33 or 34 further comprising:

parameter monitoring means for monitoring the temperature, pressure, and rate of flow of said working fluid, said monitoring means disposed between said hot outlet and said high-pressure inlet port, between said cold outlet and said low-pressure inlet port, and between said turbine exhaust port and said vortex tube inlet port both before and after said heat exchanger means.

* * * * *

UNITED STATES PATENT AND TRADEMARK OFFICE
CERTIFICATE OF CORRECTION

PATENT NO. : 4,333,017
DATED : June 1, 1982
INVENTOR(S) : John J. O'Connell

It is certified that error appears in the above-identified patent and that said Letters Patent are hereby corrected as shown below:

Column 3, line 49, after "23" change the comma to a period.
Column 6, line 6, after "would be" insert --the--.
Column 9, between lines 41 and 42, insert the following paragraph:--moving said concentrated waste fluid through said waste fluid line and condensor,--
Column 9, line 49, after "exchanged" insert --hot output working fluid and the heat exchanged--.
Column 10, line 62, before "exchanger" insert --heat--.
Column 11, line 62, before "exchanger" insert --heat--.
Column 13, line 33, before "exchanger" insert --heat--.
Column 14, line 4, "connector" should read --connected--.
Column 14, line 19, "an" should read --and--.

Signed and Sealed this

Twenty-first Day of September 1982

[SEAL]

Attest:

GERALD J. MOSSINGHOFF

Attesting Officer

Commissioner of Patents and Trademarks